(12) United States Patent
Yeoh et al.

(10) Patent No.: US 6,532,051 B1
(45) Date of Patent: Mar. 11, 2003

(54) LIQUID CRYSTAL DISPLAY WITH NONSPECULAR REFLECTORS

(75) Inventors: Colin T. Yeoh, Tseung Kwan O (HK); Hoi Sing Kwok, Tseung Kwan O (HK); York Liao, Tseung Kwan O (HK)

(73) Assignee: Varintelligent (BVI) Limited (VG)

( * ) Notice: Subject to any disclaimer, the term of this patent is extended or adjusted under 35 U.S.C. 154(b) by 192 days.

(21) Appl. No.: 09/637,983

(22) Filed: Aug. 11, 2000

(30) Foreign Application Priority Data

Aug. 12, 1999 (GB) ............................................. 9919094

(51) Int. Cl.$^7$ ........................................... G02F 1/1335
(52) U.S. Cl. ..................... 349/113; 349/171; 349/181
(58) Field of Search ................................ 349/113, 171, 349/181, 117, 123, 177

(56) References Cited

U.S. PATENT DOCUMENTS

| | | | | |
|---|---|---|---|---|
| 5,485,295 A | * | 1/1996 | Itoh et al. | 359/73 |
| 5,659,408 A | * | 8/1997 | Wenyon | 359/15 |
| 5,694,189 A | * | 12/1997 | Nakamura et al. | 349/143 |
| 5,737,047 A | * | 4/1998 | Sakamoto et al. | 349/119 |
| 5,753,937 A | * | 5/1998 | Shimomaki et al. | 257/59 |
| 5,907,378 A | * | 5/1999 | Abileah et al. | 349/123 |
| 6,025,894 A | * | 2/2000 | Shirashki et al. | 349/69 |
| 6,141,070 A | * | 10/2000 | Kaneko | 349/117 |
| 6,151,088 A | * | 11/2000 | Higa | 349/99 |
| 6,160,595 A | * | 12/2000 | Kishimoto | 349/61 |
| 6,181,394 B1 | * | 1/2001 | Sanelle et al. | 349/96 |
| 6,219,119 B1 | * | 4/2001 | Nakai | 349/113 |

* cited by examiner

Primary Examiner—Toan Ton
Assistant Examiner—Hoan Nguyen
(74) Attorney, Agent, or Firm—Blakely Sokoloff, Taylor & Zafman, LLP

(57) ABSTRACT

The present invention deals with liquid crystal displays where the incident light and reflected light going through the display are not specularly related. The incident light can be at a range of angles to the display while the reflected light, i.e. the viewing direction is at or nearly normal to the display. For such nonspecular liquid crystal displays, the polarizer angles, the input/output directors of the liquid crystal cell, and the liquid crystal cell retardation have to be specially optimized to obtain the best viewing effects. Conventional liquid crystal display modes do not work optimally in this nonspecular situation. We also disclose the new image-mode and shadow-mode nonspecular liquid crystal displays. Such displays have very bright background and are free from viewing glare common in most liquid crystal displays. The present invention applies to all twist angles, e.g. the 90° TN, the 120° and 150° HTN, the 180°, 240° and 270° STN displays.

14 Claims, 10 Drawing Sheets

LIQUID CRYSTAL DISPLAY WITH NONSPECULAR REFLECTORS

The present invention relates to a new type of liquid crystal display where the input and output light beams do not follow the usual specular relationship.

Liquid crystal displays are usually manufactured with a structure as shown in FIG. 1. It comprises an input polarizer 1, a liquid crystal cell 2, an output polarizer 3 and a reflective diffuser 4. The liquid crystal cell is commonly made of two pieces of glass 5,6, alignment layers 7,8 conductive electrode films 9,10 and the liquid crystal material 11 which possesses a twisting alignment in conformance with the alignment layers 7 and In this common reflective (or sometimes known as transflective) liquid crystal display, the light 12 enters the display from one direction at some azimuthal angle $\theta$ relative to the surface normal 13 of the display. The corresponding polar angle of the incident light is $\phi$ relative to some x-axis on the surface of the display. Thus the angles specifying the light propagation direction is given by $(\theta,\phi)$. This light is scattered and reflected by the diffusive reflector and goes through the liquid crystal cell once more and is seen by the observer 14. This light intensity is strongest at the reflection angle $(\theta,\phi+\pi)$. This is called specular reflection or glare reflection. There is light observable at angles other than $(\theta,\phi+\pi)$ as shown because of scattering, but its intensity drops off rapidly as the angle deviates from $\phi$. The situation is depicted in FIG. 2. By the same scattering mechanism, at any viewing direction $(\theta,\phi+\pi)$, there is contribution of light incident from $(\theta,\phi)$, and light from incident angles near $(\theta,\phi)$. However, a majority of the light is from the $(\theta,\phi)$ direction.

In designing and optimizing such common liquid crystal displays, the alignment direction of the top and bottom glass plates and the placement of the input and output polarizers are crucial. If one takes the example of a 90° twisted nematic liquid crystal display, the most common configuration is shown in FIG. 3. The input polarizer $P_{in}$ and the input director $n_{in}$ are aligned at right angles. The output polarizer $P_{out}$ is also perpendicular to the output liquid crystal director $n_{out}$ as shown. This is the so-called o-mode operation for the TN display. The light enters the liquid crystal display from the 12 O'clock direction 15 and the viewer looks at the display from the 6 O'clock direction 16. This is in contrast to the e-mode operation where $P_{in}$ and $n_{in}$ are parallel, and $P_{out}$ and $n_{out}$ are also parallel. The viewing angle polar plot for the o-mode TN display is shown in FIGS. 4 and 5. FIG. 4 is the polar plot for V=0 and FIG. 5 is the polar plot of transmittance for 2.5V. They show clearly the optimal viewing direction which is at the 6 O'clock position The darkest part of the polar plot in FIG. 5 indicates the light should exit the display at an azimuthal angle $\theta$ of 30° and a polar angle $\phi$ of 270°.

This optimization of the viewing angle of the liquid crystal display is well-known and has been discussed in the literature. For example, the books by Blinov et al (Electrooptic Effects in Liquid Crystal materials Springer-Verlag, 1994) and Bahadur (Liquid Crystals Applications and Uses, World Scientific, Singapore, 1990) have discussions on the viewing angle of liquid crystal displays. In these discussions, the light is assumed to traverse the liquid crystal cell at an oblique angle once. The viewing angle diagram plots the contrast of the display at the working voltages for light going through the liquid crystal cell at an angle of $(\theta,\phi)$ where $\theta$ is the angle between the light beam and the surface normal of the liquid crystal cell (the azimuthal angle) and $\phi$ is the angle between the projection of the light bean on the liquid crystal cell surface and the reference x-axis (the polar angle). The input director of the liquid crystal is also measured referenced to this x-axis. For the case of the 90° twist TN display, as shown in FIG. 3, the x-axis is usually taken to be at 45° to the input director.

In the traditional optimization of the liquid crystal display, it is generally assumed that light enters at a certain angle. Many plots of the transmission-voltage curves have been shown in the literature for various combinations of the light viewing angle characterized by $(\phi,\theta)$. Implicit in such curves, with only one value of $\theta$ specified, it is assumed that light enters and exits the cell at the same azimuthal angle. The possibility of light entering and exiting the liquid crystal cell at different azimuthal angles is never considered in the numerical and experimental optimization procedures. The present invention shows that for the case of nonspecular reflection, it is important to perform the simultaneous optimization of all important LCD parameters by considering light entering and exiting the LCD at different angles.

FIG. 6 shown the transmission-voltage curves for liquid crystal displays operating in the so-called second minimum. This second minimum corresponds to a retardation value, the product of the cell thickness and the birefringence of the liquid crystal (d$\Delta$n), of 1.075 $\mu$m and a liquid crystal twist angle of 90°. Curve 17 is when the viewing angle and the light entrance angle are 0° (normal to the cell). Curve 18 corresponds to light entering at $\theta$=30°, $\phi$=90° and the display is viewed at $\theta$=30°, $\phi$=270°. This is the so-called 6 O'clock viewing condition. Curve 19 corresponds to conditions exactly opposite to curve 18, i.e. light entering at $\theta$=30°, $\phi$=270° and the display is viewed at $\theta$=30°, $\phi$=90°. In the 6 O'clock position, the liquid crystal cell turns off at a lower voltage and the change in transmission as a function of voltage (the transmission-voltage or T-V curve 18 is sharper. This leads to a much better multiplexing capability for this display. FIGS. 7 and 8 are similar plots for the cases of 120° and 180° twist displays.

In this present invention, we recognize the fact that it is possible to manufacture LCDs where the input light angle and the output light angle are greatly different (non-specular reflection). Such a possibility of having non-specular light reflection was pointed out in U.S. Pat. No. 5,659,408 of M. Wenyon. One way of obtaining this situation is to use the so-called holographic reflector films (see, for example, M. Wenyon et al, "White Holographic Reflector for LCDs", SID Symp. Dig. 1997). There are additionally many types of structured scattering surfaces that can achieve such non-specular reflections. However, such prior LCDs do not optimize the reflection.

It is accordingly an object of the invention to seek to mitigate this disadvantage.

According to the invention there is provided a liquid crystal display, characterised by the incident light direction and the direction of light exiting the display after reflection being different directions which are non-specular.

Using the invention it is possible to provide that the incident and reflected light beams to be at different angles. The transmission-voltage curves should be calculated using different values of input and output angles.

A liquid crystal display embodying the invention, thus has all of its critical parameters simultaneously optimized allowing for the input light angle and the viewing angle to be different from each other, thus yielding retardation values of the display that are significantly different from conventional liquid crystal displays. The polarizer angles, the input/output directors and/or the liquid crystal cell retardation may thus be optimized for non-specular operation.

Another significant aspect of the present invention is the recognition of the fact that most of the nonspecular reflectors are monochromatic. That is, even with white light input, the reflected light will have a color, e.g. green. Hence the optimization of the nonspecular LCD does not have to take into account color dispersion effects. One can assume al monochromatic lights the input. Of course, this invention does not preclude the situation where the nonspecular reflector can be wide band or can reflect white light as well.

It is therefore possible using the invention to provide a set or sets of operating conditions for LCDs that are made with non-specular scattering reflectors. Such non-specular LCDs are classified into two broad categories: the image mode (i-mode) and the shadow mode (s-mode). In both the i-mode and the s-mode, the light comes into the LCD from the 12 O'clock direction with $\phi=90°$, and with $\theta$ of typically about 30–45°. The reflected light exits the LCD at near normal incidence, which is the convenient direction for viewing an LCD.

In the i-mode, the polarizer directions and the input director of the liquid crystal cell are placed in the same manner as an ordinary liquid crystal display viewed at 6 O'clock. In this way, light enters the LCD from the 12 O'clock direction, and viewed at near normal. Using the 90° TN LCD as an example, the resultant T-V curve will correspond to multiplying the T-V Curves 17 and 19 FIG. 6. As a comparison, in the conventional specular LCD with light incident from the 12 O'clock direction and viewed at the 6 O'clock direction, the overall T-V curve would correspond to multiplying curves 18 and 19.

In the s-mode, the entire polarizer-liquid crystal cell-analyzer assembly is rotated 180° while the nonspecular reflector is not changed. In this way, light still enters from (30–45°, 90°) and is viewed at (0°,0°). However, the overall T-V curve should be represented by the product of curves 17 and 18 in FIG. 6. The most important observation is that the s-mode turns on much earlier at a much lower voltage than the i-mode device. Moreover, the overall transmission-voltage curve is much steeper in the case of the s-mode than the i-mode. Steeper T-V curve means that more data can be shown on the display with less cross talk. Both the non-specular i-mode and s-mode are different from the specular LCD in terms of the T-V curve.

While FIG. 6 illustrates the idea of the present invention using the 90° TN LCD, the same idea applies to all twist angles. For example, FIGS. 7 and 8 show the transmission-voltage curves for the case of 120° twist and 180° twist displays. It can be seen that there is a large difference between 6 O'clock light incidence and 12 O'clock light incidence as well. Thus for non-specular reflection displays, the arrangement of the polarizers and the directions of the viewing angle and light incident angle are critical in obtaining a good contrast display.

The fact that the taking into account of the angle of incidence in optimizing both the s-mode and i-mode display is illustrated by FIG. 9. In this Figure, we plot the transmittance of 120° twist display as a function of the dΔn value of the liquid crystal. Here d stands for the thickness of the liquid crystal cell and Δn is the birefringence of the liquid crystal material. There are four curves with light incident angles ranging from 0° to 60°. It can clearly be seen that the position of the first minimum (actually the first peak with 100% normalized transmittance) shifts to lower values as the light incidence angle increases. The difference between the 0° case and 60° case is as much as 50% decrease in dΔn.

The polarizer placement is also important in optimizing the i-mode and s-mode displays. Again, using the 120° twist display as an example, FIG. 9 shows the transmittance as a function of dΔn for the polarizer arrangement shown in FIG. 10. It can be seen that the peak of the first minimum has shifted to a lower dΔn value as the light incident angle is increased to 60°. However, if the polarizer arrangements is changed to the one shown in FIG. 11, then the peak shifts to a larger value of dΔn as the light incident angle is increased, as shown in FIG. 12.

In FIG. 13, the need for optimization of the non-specular display is shown, taking into account both the angle of incidence and angle of reflection. In FIG. 13, we plot the change in transmittance as a function of dΔn for 0° and 60° angle of incidence. We also plot the product of the two curves since light will traverse the liquid crystal cell at these two directions. This represents the non-specular reflection case of light incident at 60° degree to the display and viewed at near normal angle. It can be seen that the shifts in the peak of the first minimum is not as drastic, but nonetheless is still significant.

For a better understanding of the present invention, embodiments will now be described by way of example, with reference to the accompanying drawings, in which.

Figure 1:
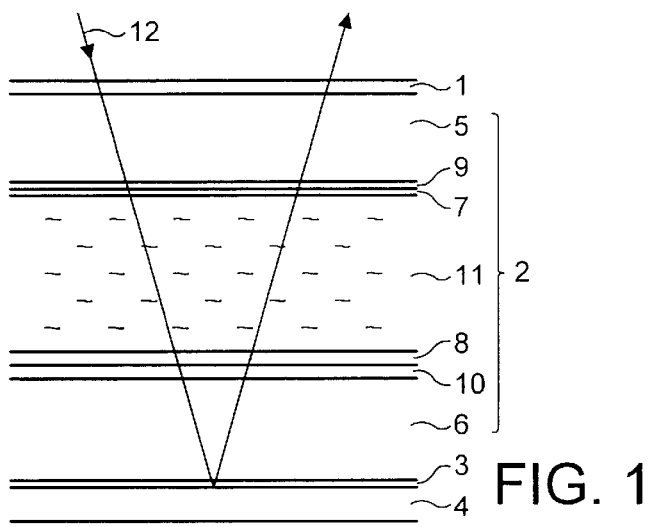
FIG. 1 shows the components of a typical known liquid crystal display.
Figure 2:
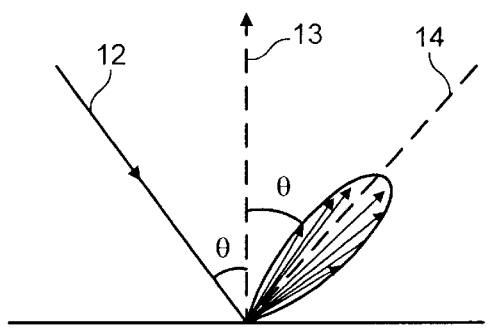
FIG. 2 shows the scattering of light by a common diffusive reflector used in transflective LCD.
Figure 3:
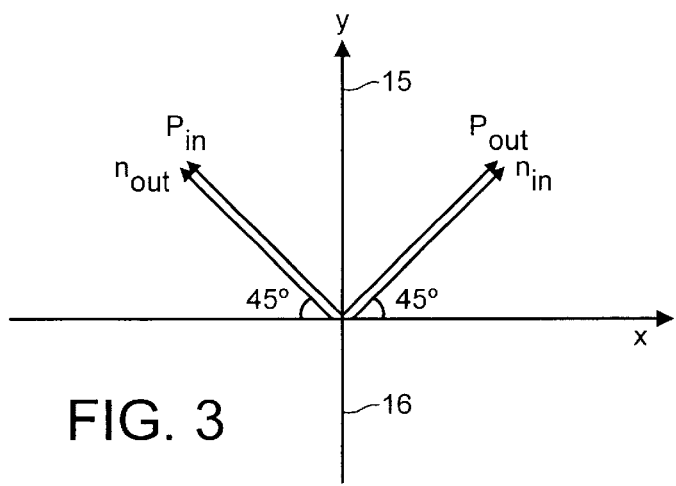
FIG. 3 shows the common alignment of polarizers and liquid crystal directors for a 90° TN LCD, for optimal viewing at the 6 O'clock position.
Figure 4:
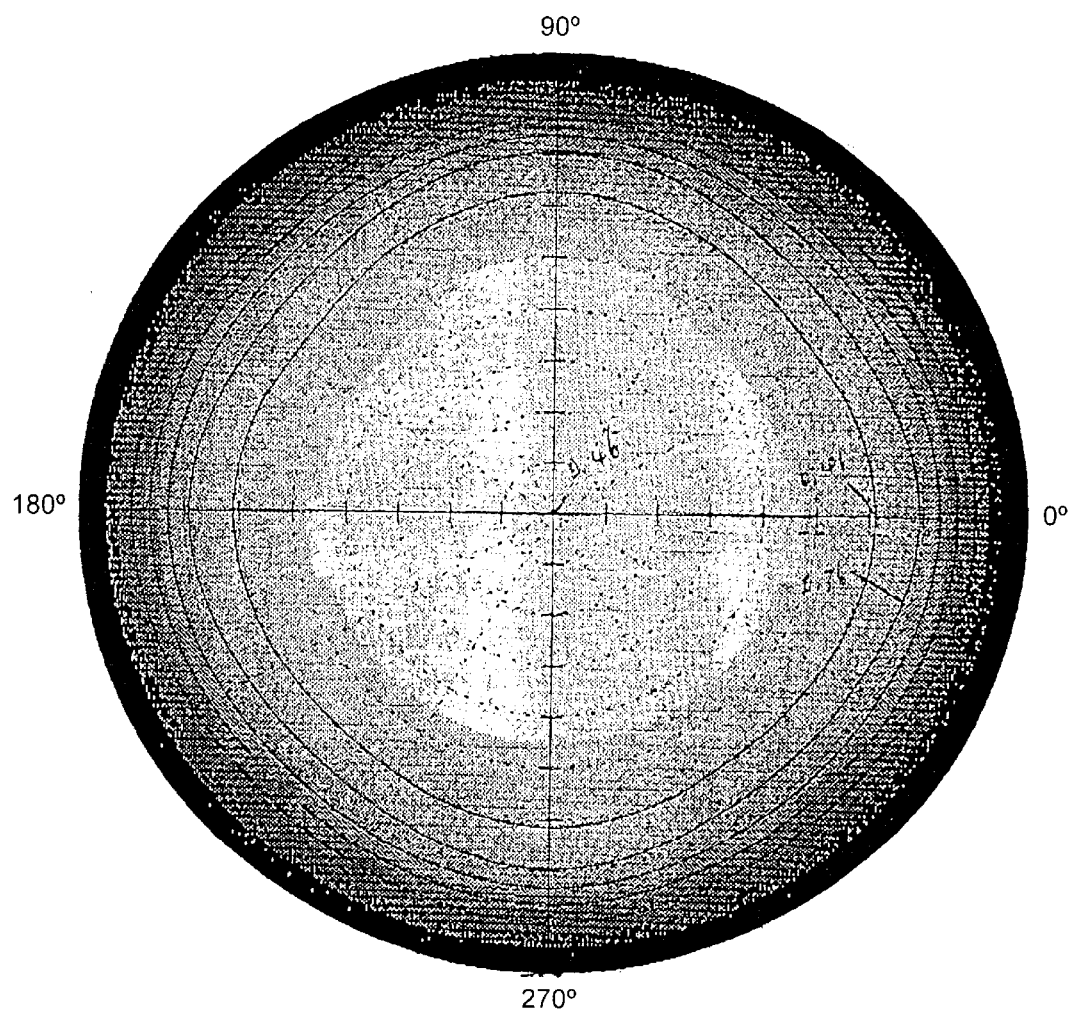
FIG. 4 shows the polar plot of the OV transmittance of a 90° TN LCD with polarizers and liquid crystal directors as shown in FIG. 3.
Figure 5:
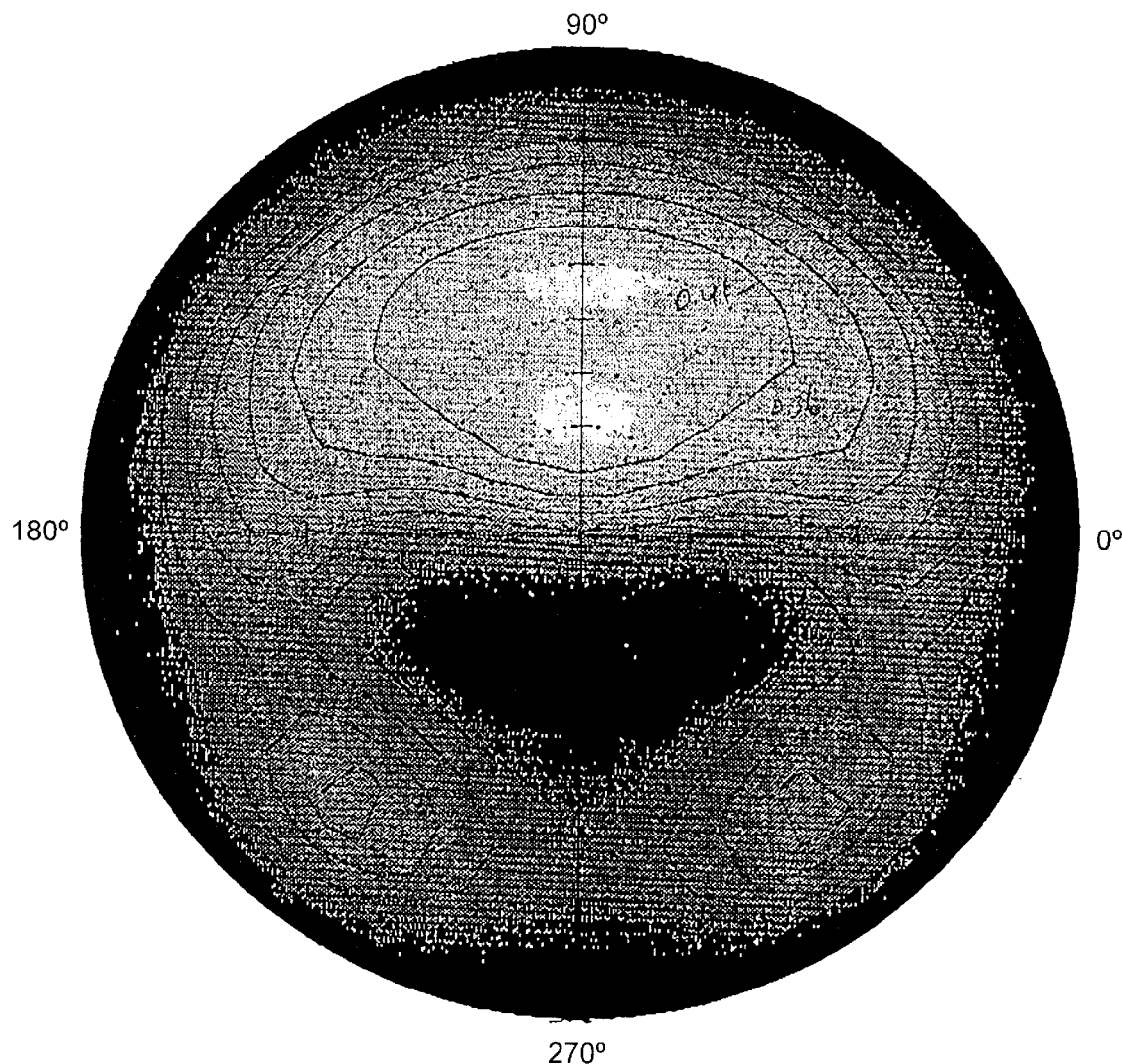
FIG. 5 shows the polar plot of the 2.5V transmittance of 90° TN LCD with polarizers and liquid crystal directors as shown in FIG. 3.
Figure 6:
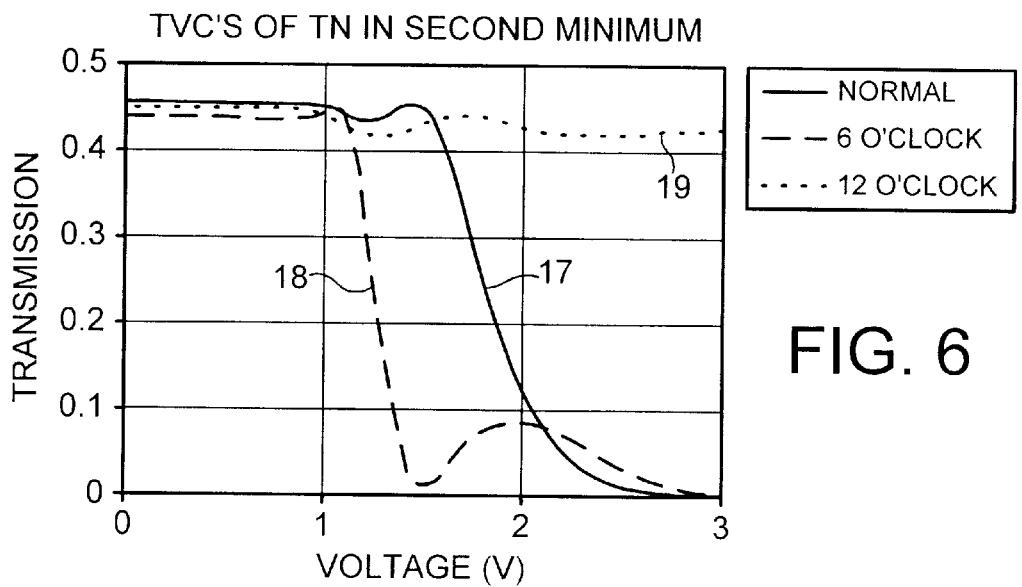
FIG. 6 shows the transmission-voltage curves for the 90° TN LCD for light entering the display at various angles of incidence. Curve A is when the viewer is at −30° (6 O'clock), curve B is when the viewer at 0° (normal to the cell), and curve C corresponds to the viewer at +30° (12 O'clock)
Figure 7:
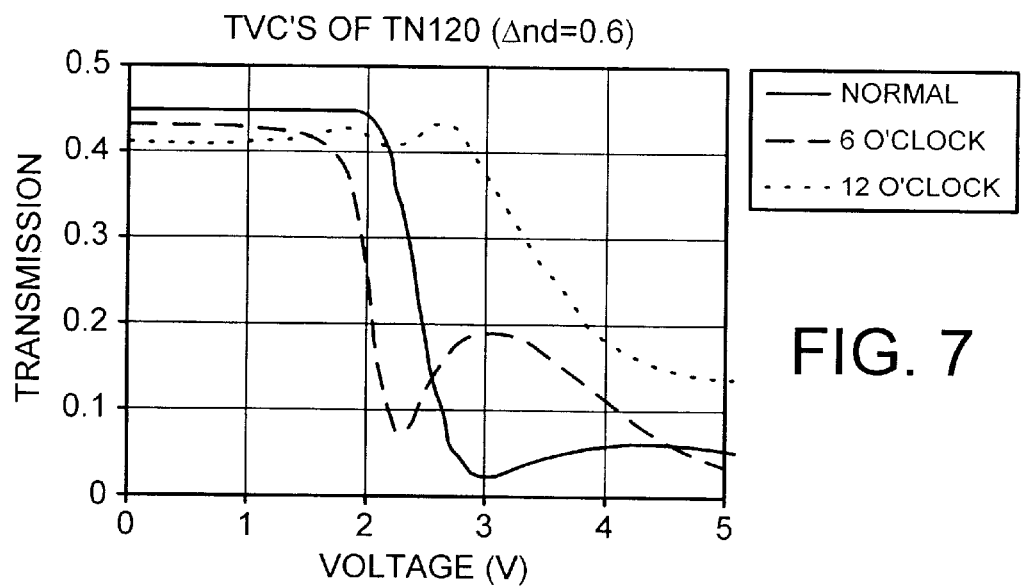
FIG. 7 shows the transmission-voltage curves for the 120° TN LCD for light entering the display at various angles of incidence. Curve A is when the viewer is at −30° (6 O'clock), curve B is when the viewer at 0° (normal to the cell), and curve C corresponds to the viewer at +30° (12 O'clock)
Figure 8:
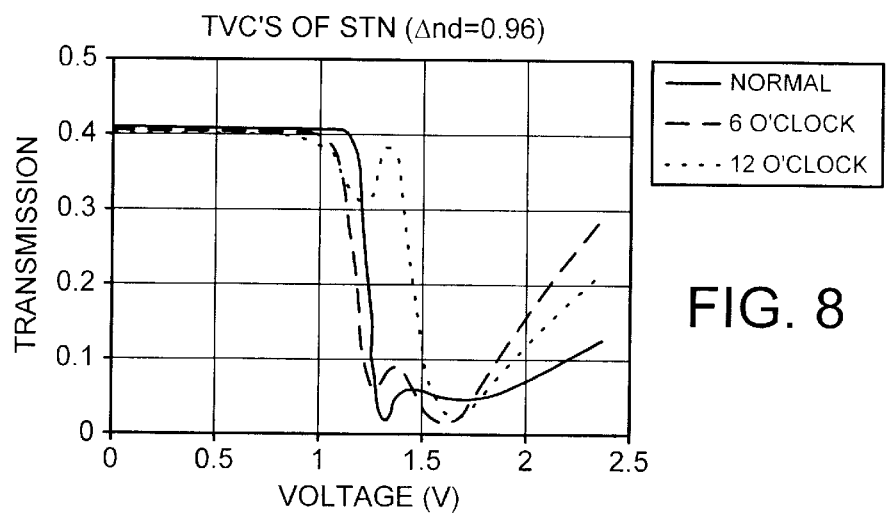
FIG. 8 shows the transmission-voltage curves for the 180° TN LCD for light entering the display at various angles of incidence. Curve A is when the viewer is at −30° (6 O'clock), curve B is when the viewer at 0° (normal to the cell), and curve C corresponds to the viewer at +30° (12 O'clock)
Figure 9:
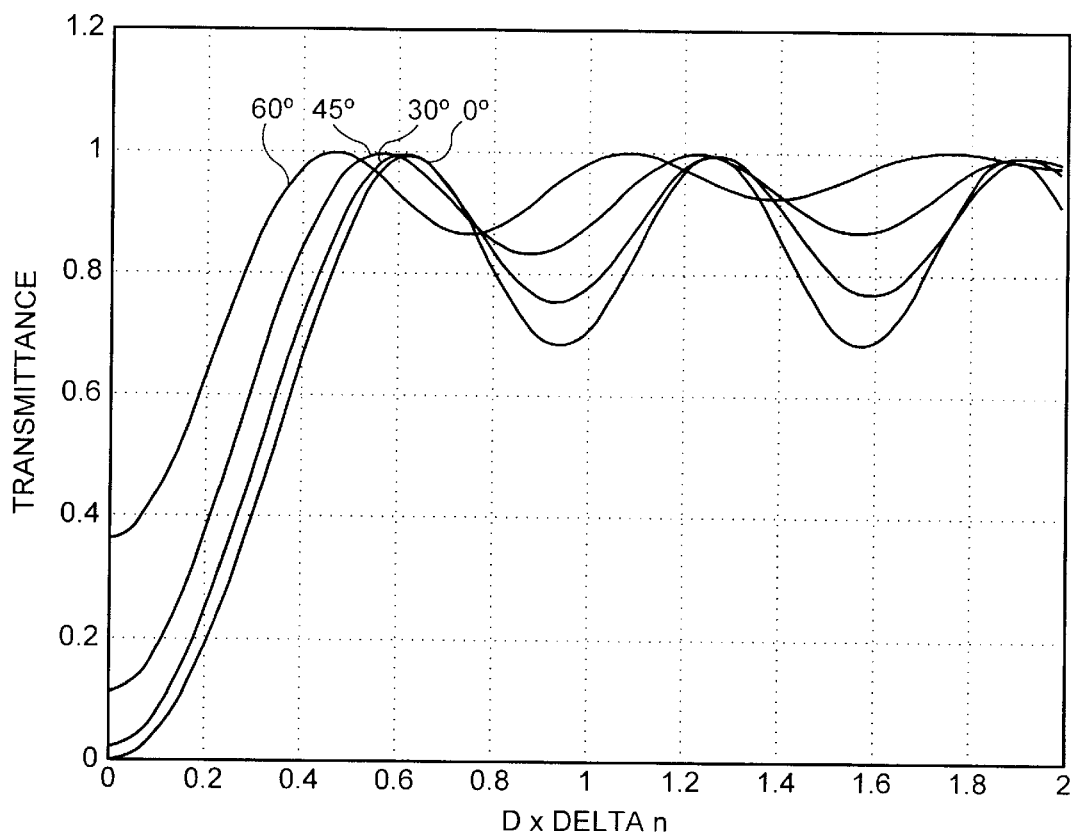
FIG. 9 shows transmittance of the 120° twist LCD as a function of dΔn for various light angles of incidence
Figure 10:
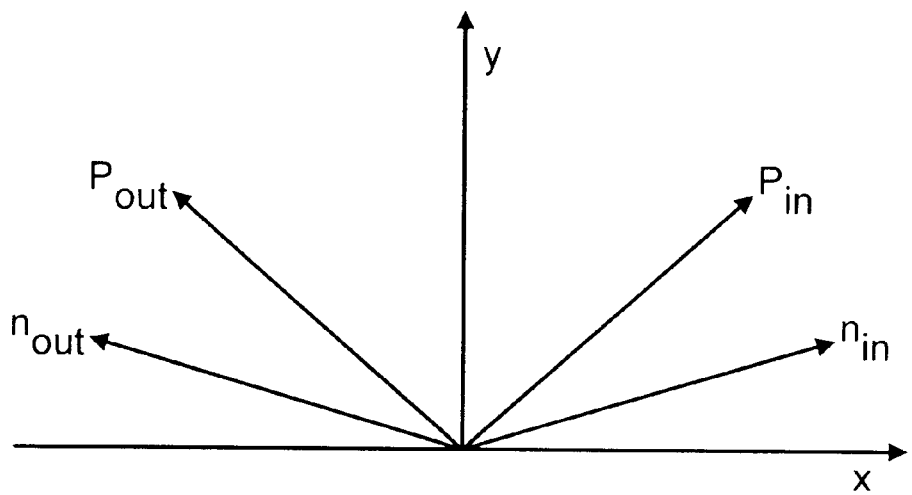
FIG. 10 shows a regular polarizer arrangement.
Figure 11:
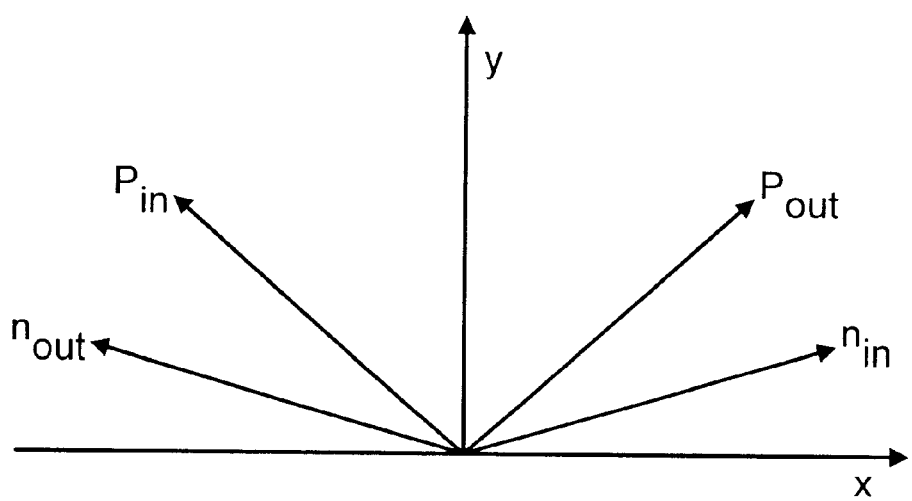
FIG. 11 shows an inverted polarizer arrangement.
Figure 12:
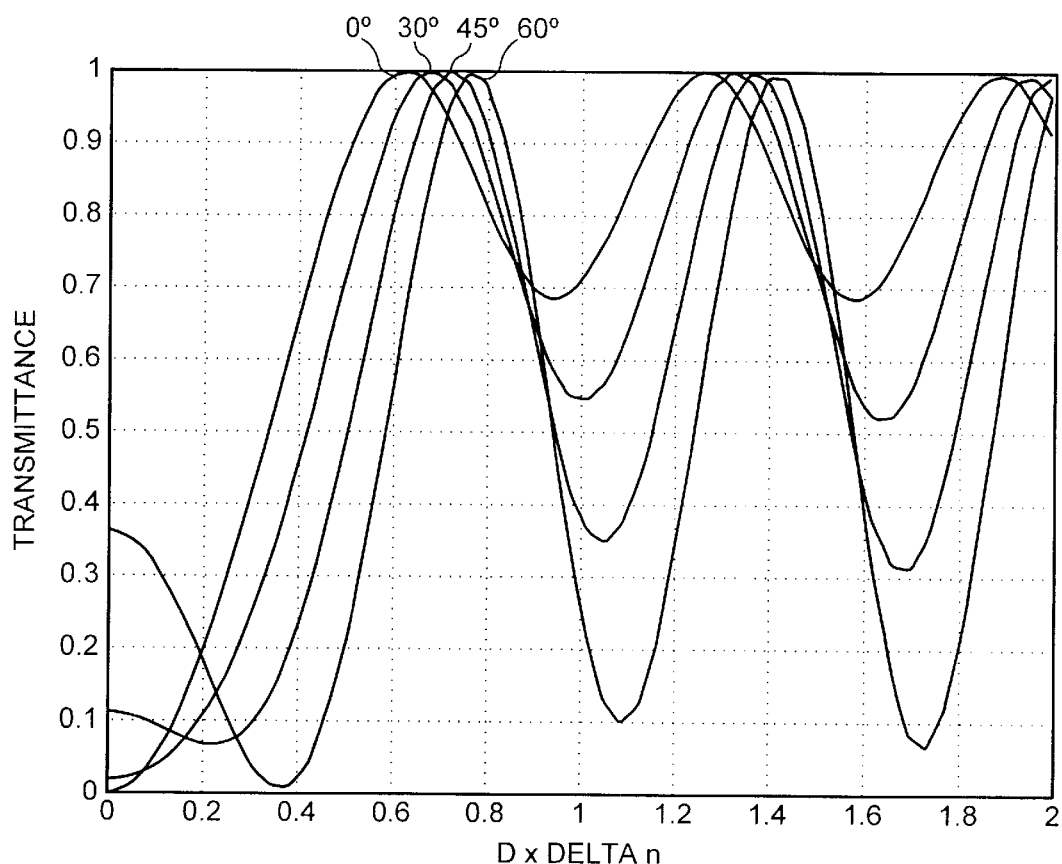
FIG. 12 shows transmittance of the 120° twist LCD as a function of dΔn for various light angles of incidence.
Figure 13:
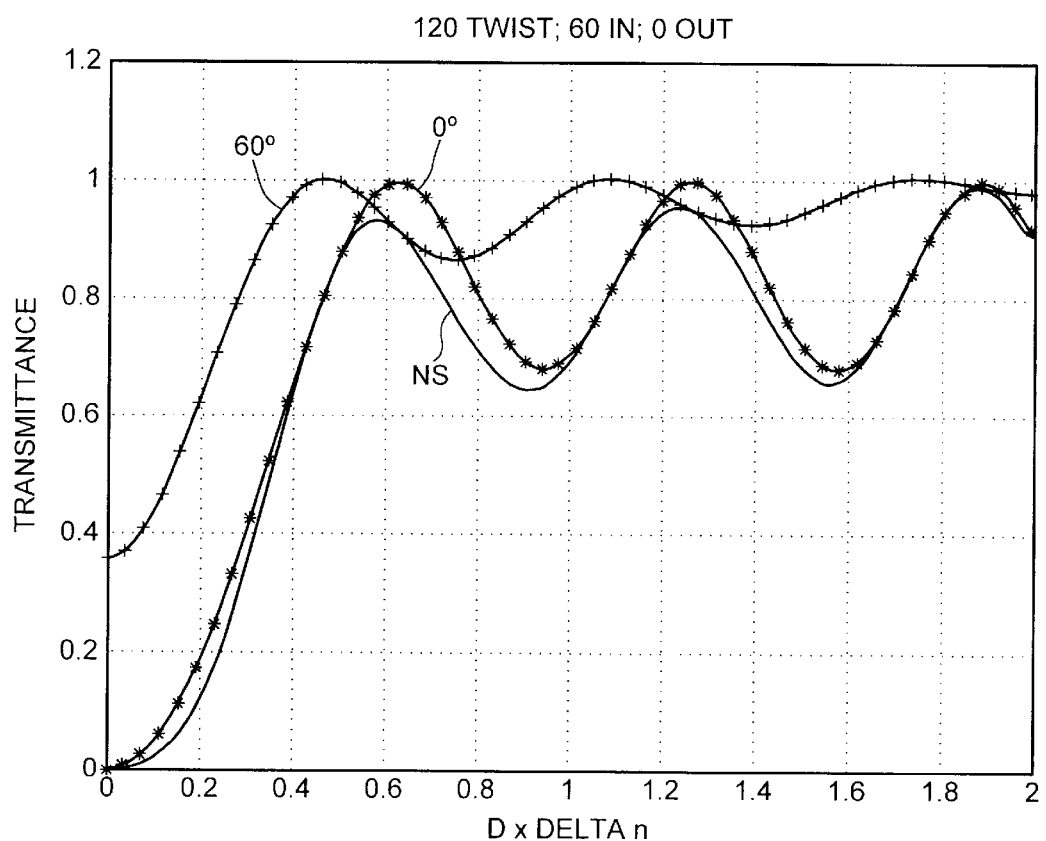
FIG. 13 shows transmittance of the 120° twist LCD as a function of dΔn for the cases of 0° and 60° angles of incidence for the regular polarizer arrangement in FIG. 12.
Figure 14:
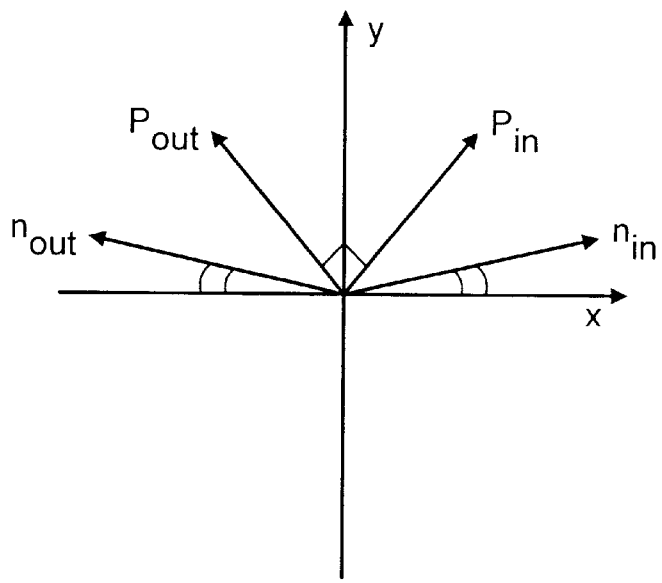
FIG. 14 shows alignment of the polarizers and the liquid crystal directors for the first preferred embodiment.

In the first embodiment of the new liquid crystal display according to the present invention, the alignment of the polarizers and the liquid crystal directors are as shown in FIG. 14. The polarizers are at or near 90° to each other, and are disposed symmetrically with respect to the input and output directors of the liquid crystal cell. In this embodiment, the input polarizer $P_{in}$ is on the same side as the input director $n_{in}$ relative to the y-axis. The twist angle of the liquid crystal, which corresponds to the angle between $n_{in}$ and $n_{out}$, can be any angle from 60° to 270°. In particular, it can be 90° TN, or a 120° HTN, or a 180°–240° STN display. The values of the thickness d times the birefringence Δn of the liquid crystal cell can be any of the values listed in Table III below. For each twist angles the dΔn value can correspond to the first minimum or second minimum according to the design of LCDs. This embodiment corresponds to a 6 O'clock viewing of the LCD. In this arrangement, light enters the display from the φ=90° direction at an oblique angle and viewed at near normal direction. This is also the i-mode display.

Figure 15:
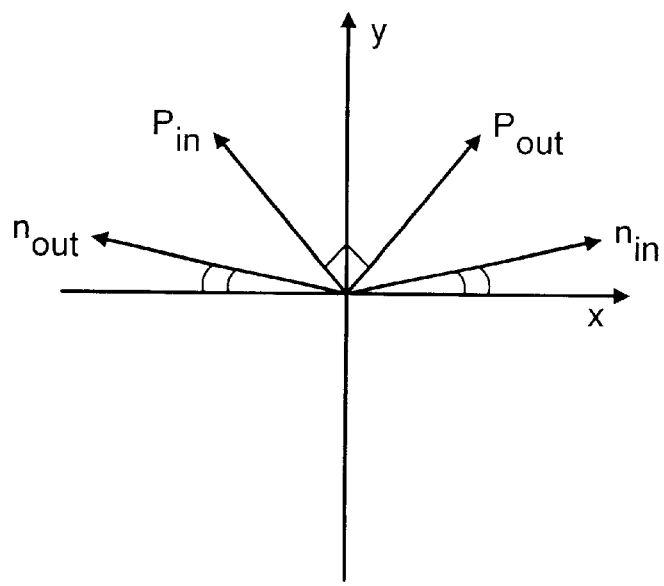
FIG. 15 shows alignment of the polarizers and the liquid crystal directors for the second preferred embodiment.

In the second embodiment of the new liquid crystal display according to the invention, the alignment of the polarizers and the liquid crystal directors are as shown in FIG. 15. The polarizers are at or near 90° to each other, and are disposed symmetrically with respect to the input and output directors of the liquid crystal cell. In this embodiment, the input polarizer $P_{in}$ is on the opposite side as the input director $n_{in}$ relative to the y-axis. The twist angle of the liquid crystal, which corresponds to the angle between $n_{in}$ and $n_{out}$, can be any angle from 60° to 270°. In particular, it can be a 90° TN, or a 120° TN, or a 180°–240° STN display. The values of the thickness d times the birefringence Δn of the liquid crystal cell can be any of the values listed in Table III below. For each twist angle, the dΔn value can correspond to the first minimum or second minimum according to the design of LCDs. This embodiment corresponds to a 6 O'clock viewing of the LCD. In this arrangement, light enters the display from the φ=90° direction at an oblique angle and viewed at near normal direction. This is also the i-mode display.

Figure 16:
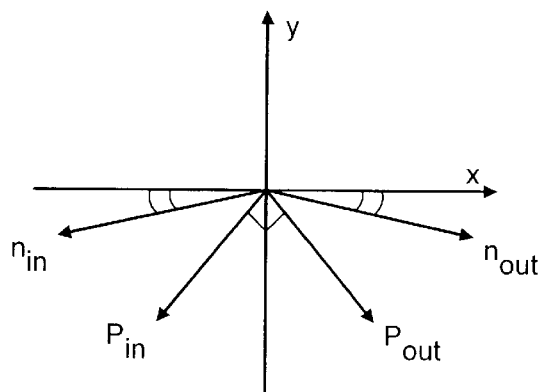
FIG. 16 shows alignment of the polarizers and the liquid crystal directors for the third preferred embodiment.

In the third embodiment of the new liquid crystal display according to the invention, the alignment of the polarizers and the liquid crystal directors are as shown in FIG. 16. The polarizers are at or near 90° to each other, and are disposed symmetrically with respect to the input and output directors of the liquid crystal cell. In this embodiment, the input polarizer $P_{in}$ is on the same side as the input director n relative to the y-axis. The twist angle of the liquid crystal, which corresponds to the angle between $n_{in}$ and $n_{out}$, can be any angle from 60° to 270°. In particular, it can be a 90° TN, or a 120° HTN, or a 180°–240° STN display. The values of the thickness d times the birefringence Δn of the liquid crystal cell can be any of the values listed in Table III below. For each twist angle, the dΔn value can correspond to the first minimum or second minimum according to the design of LCDs. This embodiment corresponds to a 12 O'clock viewing of the LCD. In this arrangement, light enters the display from the φ=90° direction at an oblique angle and viewed at near normal direction. This is also the s-mode display.

Figure 17:
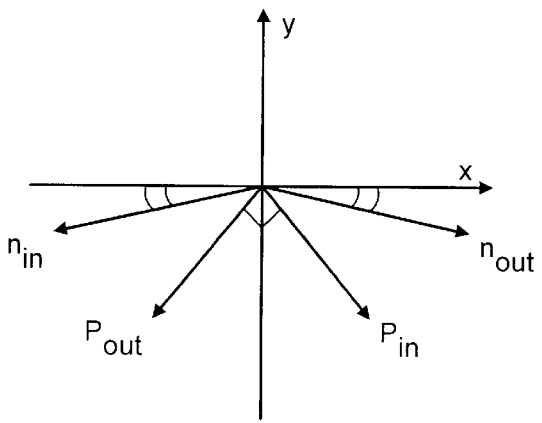
FIG. 17 shows alignment of the polarizers and the liquid crystal directors for the fourth preferred embodiment.

In the fourth embodiment of the new liquid crystal display according to the invention, the alignment of the polarizers and the liquid crystal directors are as shown in FIG. 17. The polarizers are at or near 90° to each other, and are disposed symmetrically with respect to the input and output directors of the liquid crystal cell. In this embodiment, the input polarizer $P_{in}$ is on the opposite side as the input director $n_{in}$ relative to the y-axis. The twist angle of the liquid crystal, which corresponds to the angle between $n_{in}$ and $n_{out}$ can be any angle from 60° to 270°. In particular, it can be a 90° TN, or a 120° HTN, or a 180°–240° STN display. The values of the thickness d times the birefringence Δn of the liquid crystal cell can be any of the values listed in Table III below. For each twist angle, the dΔn value can correspond to the first minimum or second minimum according to the design of LCDs. This embodiment corresponds to a 6 O'clock viewing of the LCD. In this arrangement, light enters the display from the φ−90° direction at an oblique angle and viewed at near normal direction. This is also the s-mode display.

Figure 18:
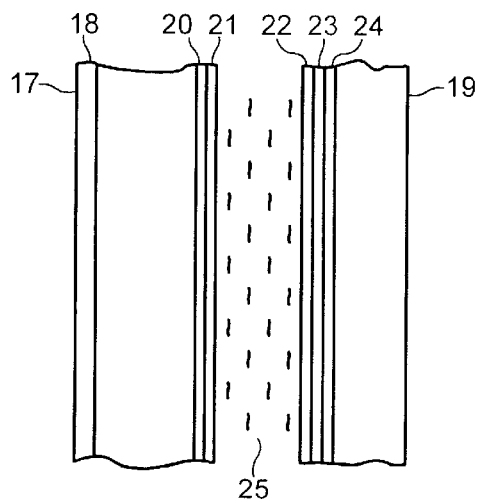
FIG. 18 shows liquid crystal display structure for the fifth preferred embodiment.

In the fifth embodiment of this new liquid crystal display, the rear polarizer can be absent. The normal version of this display has been discussed by Yu et al, "A New TN-LCD Mode Reflective LCD with Large Cell Gap and Low Operating Voltage", pp 155–158, Int'l Display Research Conference, Toronto, 1997. In the embodiment discussed here, the nonspecular reflector 24 can be placed inside the liquid crystal cell as shown in FIG. 18. In this preferred embodiment, only an input polarizer 17 is needed. The liquid crystal display consists of the usual glass substrates 18 and 19, the liquid crystal alignment layers 21 and 22, the patterned conductive transparent electrodes 20 and 23, and the liquid crystal 25. The nonspecular reflector 24 may or may not have a protective coating between itself and the patterned electrode 23. The twist angle and the polarizer angles are optimized for oblique incident light and near normal viewing. Since the nonspecular reflector 24 is inside the liquid crystal cell, there is no shadow effect. Both the shadow mode and image mode can be seen simultaneously. Depending on the polarizer arrangement a described in the previous preferred embodiments, the display can be either in the s-mode or the i-mode. For the s-mode operation the threshold is significantly lowered and the T-V curve significantly sharper than the i-mode operation.

TABLE I

First possible geometry of various LCD modes. All angles are measured relative to the x-axis which is horizontal to the viewing direction pointing from left to right.

| TWIST ANGLE | INPUT DIRECTOR ANGLE | OUTPUT DIRECTOR ANGLE | INPUT POLARIZER ANGLE | OUTPUT POLARIZER ANGLE |
|---|---|---|---|---|
| 90° | 45° | 135° | 45° | −45° |
| 120° | 30° | 150° | 45° | −45° |
| 150° | 15° | 165° | 45° | −45° |
| 180° | 0° | 180° | 45° | −45° |
| 240° | −30° | 210° | 45° | −45° |

TABLE II

Second possible geometry of various LCD modes. All angles are measured relative to the x-axis which is horizontal to the viewing direction pointing from left to right.

| TWIST ANGLE | INPUT DIRECTOR ANGLE | OUTPUT DIRECTOR ANGLE | INPUT POLARIZER ANGLE | OUTPUT POLARIZER ANGLE |
|---|---|---|---|---|
| 90° | 45° | 135° | 45° | 45° |
| 120° | 30° | 150° | −45° | 45° |
| 150° | 15° | 165° | −45° | 45° |
| 180° | 0° | 180° | −45° | 45° |
| 240° | −30° | 210° | −45° | 45° |

TABLE III

Optimal retardation values of the various operating conditions of the non-specular display.

| TWIST ANGLE | FIRST MINIMUM ($\mu$m) | FIRST MINIMUM AT ±60° INCIDENCE ($\mu$m) | SECOND MINIMUM ($\mu$m) | SECOND MINIMUM AT ±60° INCIDENCE ($\mu$m) |
|---|---|---|---|---|
| 90° | 0.5 | 0.4 | 1.075 | 0.95 |
| 120° | 0.6 | 0.52 | 1.24 | 1.2 |
| 150° | 0.64 | 0.58 | 1.28 | 1.25 |
| 180° | 0.63 | 0.61 | 1.27 | 1.25 |
| 240° | 0.66 | 0.56 | 1.38 | 1.25 |

We claim:

1. A liquid crystal display, comprising:
   (i) an incident light direction;
   (ii) a direction of light exiting the display after reflection;
   (iii) said directions being different and non-specular;
   (iv) an input polarizer;
   (v) a liquid crystal cell;
   (vi) a non-specular reflector at the rear of the display wherein said display comprises a twist angle of 120°±10° a thickness times birefringence product of 0.6±0.1 $\mu$m. and
   (vii) wherein polarizer(s) and liquid crystal director(s) are arranged to provide an image mode (i-mode) operation.

2. A liquid crystal display, comprising:
   (i) an incident light direction;
   (ii) a direction of light exiting the display after reflection;
   (iii) said directions being different and non-specular;
   (iv) an input polarizer;
   (v) a liquid crystal cell;
   (vi) a non-specular reflector at the rear of the display wherein said display comprises a twist angle of 120°±10°, a thickness times birefringence product of 1.24°±0.1 $\mu$m and
   (vii) wherein polarizer(s) and liquid crystal director(s) are arranged to provide an image mode (i-mode) operation.

3. A liquid crystal display, comprising:
   (i) an incident light direction;
   (ii) a direction of light exiting the display after reflection;
   (iii) said directions being different and non-specular;
   (iv) an input polarizer;
   (v) a liquid crystal cell;
   (vi) a non-specular reflector at the rear of the display wherein said display comprises a twist angle of 180°±10°, a thickness birefringence product of 0.62±0.1 $\mu$m, and
   (vii) wherein polarizer(s) and liquid crystal director(s) are arranged to provide an image mode (i-mode) operation.

4. A liquid crystal display, comprising:
   (i) an incident light direction;
   (ii) a direction of light exiting the display after reflection;
   (iii) said directions being different and non-specular;
   (iv) an input polarizer;
   (v) a liquid crystal cell;
   (vi) a non-specular reflector at the rear of the display wherein said display comprises a twist angle of 180°±10° thickness times birefringence product of 1.25°±0.1 $\mu$m and
   (vii) wherein polarizer(s) and liquid crystal director(s) are arranged to provide an image mode (i-mode) operation.

5. A liquid crystal display comprising
   (i) an incident light direction;
   (ii) a direction of light exiting the display after reflection;
   (iii) said directions being different and non-specular;
   (iv) an input polarizer;
   (v) a liquid crystal cell;
   (vi) a non-specular reflector at the rear of the display wherein said display comprises a twist angle of 240°±10°, a thickness times birefringence product of 1.3±0.1 $\mu$m and
   (vii) wherein polarizer(s) and liquid crystal director(s) are arranged to provide an image mode (i-mode) operation.

6. A liquid crystal display, comprising:
   (i) an incident light direction;
   (ii) a direction of light exiting the display after reflection;
   (iii) said directions being different and non-specular;
   (iv) an input polarizer;
   (v) a liquid crystal cell;
   (vi) a non-specular reflector at the rear of the display wherein said display comprises a twist angle of 90°±240°, by polarizer(s) and liquid crystal director(s) are arranged to provide an image mode (i-mode) operation.

7. A liquid crystal display, comprising:
(i) an incident light direction;
(ii) a direction of light exiting the display after reflection;
(iii) said directions being different and non-specular;
(iv) an input polarizer;
(v) a liquid crystal cell;
(vi) a non-specular reflector at the rear of the display wherein said display comprises a twist angle of 120°±10°, a thickness times birefringence product of 0.6±0.1 μm, wherein polarizer(s) and liquid crystal director(s) are arranged to provide a shadow mode (s-mode) operation.

8. A liquid crystal display, comprising:
(i) an incident light direction;
(ii) a direction of light exiting the display after reflection;
(iii) said directions being different and non-specular;
(iv) an input polarizer;
(v) a liquid crystal cell;
(vi) a non-specular reflector at the rear of the display wherein said display comprises a twist angle of 120°±10°, a thickness times birefringence product of 1.24°±0.1 μm, wherein polarizer(s) and liquid crystal director(s) being arranged to provide a shadow mode (s-mode) operation.

9. A liquid crystal display, comprising:
(i) an incident light direction;
(ii) a direction of light exiting the display after reflection;
(iii) said directions being different and non-specular;
(iv) an input polarizer;
(v) a liquid crystal cell;
(vi) a non-specular reflector at the rear of the display wherein said display comprises a twist angle of 180°±10°, a thickness times birefringence product of 0.62°±0.1 μm, wherein polarizer(s) and liquid crystal director(s) are arranged to provide a shadow mode (s-mode) operation.

10. A liquid crystal display, comprising:
(i) an incident light direction;
(ii) a direction of light exiting the display after reflection;
(iii) said directions being different and non-specular;
(iv) an input polarizer;
(v) a liquid crystal cell;
(vi) a non-specular reflector at the rear of the display wherein said display comprises a twist angle of 180°±10°, a thickness times birefringence product of 1.25°±0.1 μm, wherein polarizer(s) and liquid crystal director(s) are arranged to provide a shadow mode (s-mode) operation.

11. A liquid crystal display, comprising:
(i) an incident light direction;
(ii) a direction of light exiting the display after reflection;
(iii) said directions being different and non-specular;
(iv) an input polarizer;
(v) a liquid crystal cell;
(vi) a non-specular reflector at the rear of the display wherein said display comprises a twist angle of 240°±10°, a thickness times birefringence product of 0.65°±0.1 μm, wherein polarizer(s) and liquid crystal director(s) are arranged to provide a shadow mode (s-mode) operation.

12. A liquid crystal display, comprising:
(i) an incident light direction;
(ii) a direction of light exiting the display after reflection;
(iii) said directions being different and non-specular;
(iv) an input polarizer;
(v) a liquid crystal cell;
(vi) a non-specular reflector at the rear of the display wherein said display comprises a twist angle of 90°±240°, wherein polarizer(s) and liquid crystal director(s) are arranged to provide an shadow mode (s-mode) operation.

13. A liquid crystal display, comprising:
(i) an incident light direction;
(ii) a direction of light exiting the display after reflection;
(iii) said directions being different and non-specular;
(iv) an input polarizer;
(v) a liquid crystal cell;
(vi) a non-specular reflector at the rear of the display wherein said display comprises a polarizer and liquid crystal alignment as shown in Table I, and by retardation values as shown in Table III.

14. A liquid crystal display, comprising:
(i) an incident light direction;
(ii) a direction of light exiting the display after reflection;
(iii) said directions being different and non-specular;
(iv) an input polarizer;
(v) a liquid crystal cell;
(vi) a non-specular reflector at the rear of the display wherein said display comprises a polarizer and liquid crystal alignment as shown in Table II, and by retardation values as shown in Table III.

* * * * *